United States Patent
Ryzhov

(10) Patent No.: US 6,944,846 B2
(45) Date of Patent: Sep. 13, 2005

(54) ALGORITHM FOR LOCALIZATION OF A JAVA APPLICATION USING REFLECTION API AND A CUSTOM CLASS LOADER

(75) Inventor: Aleksandr O. Ryzhov, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 607 days.

(21) Appl. No.: 10/014,476

(22) Filed: Dec. 14, 2001

(65) Prior Publication Data

US 2003/0126310 A1 Jul. 3, 2003

(51) Int. Cl.[7] .................................................. G06F 9/44
(52) U.S. Cl. ..................... 717/116; 717/100; 717/166; 715/700
(58) Field of Search ................................ 717/116, 100, 717/166; 715/700

(56) References Cited

U.S. PATENT DOCUMENTS

| | | | |
|---|---|---|---|
| 6,025,836 A | | 2/2000 | McBride |
| 6,275,978 B1 | * | 8/2001 | Bell ............................ 717/143 |
| 6,446,254 B1 | * | 9/2002 | Chapman et al. ............ 717/116 |
| 6,492,995 B1 | * | 12/2002 | Atkin et al. ................. 345/703 |
| 6,584,612 B1 | * | 6/2003 | Mueller et al. .............. 717/166 |

FOREIGN PATENT DOCUMENTS

EP        1100004 A2        5/2001

OTHER PUBLICATIONS

Brandon, Daneil, Jr; "Localization of Web Content", p. 345–358, ACM Dec. 2001, retrieved Sep. 16, 2004.*
Kokkotos, Stavros; Spyropoulos, Constantine D. "An Architecture for Designing Internationalized Software", p. 13–21, IEEE Jul. 1997, retrieved Sep. 16, 2004.*
Liang, Sheng; Bracha, Gilad; "Dynamic Class Loading in the JAVA Virtual Machine", p. 36–44, 1998 ACM, retrieved Sep. 16, 2004.*
Piroumian, Vartan; "Internationalization Support in JAVA", p. 20–29, IEEE 1997, retrieved Sep. 16, 2004.*
Jul. 23, 2003 GB Search Report corresponding to application No. 0227216.9 in GB.

* cited by examiner

Primary Examiner—Wei Y. Zhen
Assistant Examiner—Mary Steelman

(57) ABSTRACT

A method and corresponding apparatus for localization of a JAVA® application using a reflection API and a custom class loader use specifics of JAVA® language to provide localization of certain data elements, i.e., variables, of the application during class loading. The method and corresponding apparatus for localization reduce complexity of the JAVA® application by eliminating the function code dedicated to localization. In addition, the method and apparatus for localization increase productivity of engineers who write language-independent code, and reduce memory consumption of classes that use localized strings. Since all localization is accomplished when the class is loaded and since the code that uses localization is independent of the code performing localization, the method and apparatus for localization ensure better performance of the application and afford better code reusability.

18 Claims, 5 Drawing Sheets

ALGORITHM FOR LOCALIZATION OF A JAVA APPLICATION USING REFLECTION API AND A CUSTOM CLASS LOADER

TECHNICAL FIELD

The technical field relates to JAVA® applications, and, in particular, to JAVA® applications whose user interfaces support multiple human languages. (JAVA is a trademark of Sun Microsystems, Inc.)

BACKGROUND

Localization is a process of adding support of another human language (referred to as target language) to an application. Localization can be divided into two parts: localization of user interface data and localization of other data. User interface data includes a limited number of data elements, which are defined during application development. User interface data elements can be defined in text, graphics or other form.

User interfaces of many applications can be localized if an environment supports the target language. The term "environment" includes operating system, programming language and application libraries, fonts and character tables. If the environment supports the target language, the localized version of the application for the target language can be created using the following "straightforward" method: take source or binary code of the application and replace string constants with corresponding string constants in the target language. The straightforward method is expensive for large applications because: a) the localization process must be repeated for every new version of the application; and b) the personnel that perform the localization must deal with the application source or binary code.

A widely known solution to the problems of the straightforward method is to keep language-specific data in resource files, because multi-language support in application architecture can reduce cost of localization. The resource files contain key-value pairs, and the application locates data elements in the resource files by finding a value corresponding to a certain key. However, this approach also has a disadvantage: the programmer has to write a function call for every localized string, which results in large amount of function code dedicated to localization, for example, to retrieve localized strings for a current language.

The JAVA® programming language simplifies the implementation of resource file-based solution by providing java.util.ResourceBundle class in the standard library. This class provides support for human language-specific resource files. However, if the programmer uses class ResourceBundle directly, the amount of code dedicated to localization still remains large. In addition, localization-specific code is typically spread all over the application code, making it difficult to read and maintain.

SUMMARY

A method for localization of a JAVA® application includes locating a plurality of localizable variables of a class using a custom class loader, finding a corresponding resource file for a current language for each localizable variable, and calculating a key for each localizable variable. The method further includes finding a localized string in the resource file corresponding to each key, and assigning the localized string to the corresponding localizable variable of the class. Accordingly, the custom class loader provides localization of the class during class loading.

The method and corresponding apparatus for localization reduce complexity of the JAVA® application by eliminating the function code dedicated to localization. In addition, the method and apparatus for localization increase productivity of engineers who write language-independent code, and reduce memory consumption of classes that use localized strings. Since all localization is accomplished when the class is loaded and since the code that uses localization is independent of the code performing localization, the method and apparatus for localization ensure better performance of the application and afford better code reusability.

DESCRIPTION OF THE DRAWINGS

The preferred embodiments of a method and apparatus for localization using a reflection application programming interface (API) and a custom class loader will be described in detail with reference to the following figures, in which like numerals refer to like elements, and wherein.

DETAILED DESCRIPTION

Many applications need to provide multi-language support in the user interfaces. For example, an application may support English and Japanese. A user may choose the language during an installation or when the application starts. In some cases an application determines the language based on the operating system's default language. After the user specifies the language the application will communicate with the user in the specified language. For example, if the user selects "Japanese", the application will display its messages in Japanese.

The user interface of the application typically contains characters, words, phrases and sentences in the user's language. These characters, words, phrases and sentences are usually defined as "strings" in the application. These strings can be located in the application code and/or in resource files transferred together with the application.

A method and corresponding apparatus for localization of a JAVA® application using a reflection API and a custom class loader use specifics of JAVA® language to provide localization of certain data elements, i.e., variables, of the application during class loading. The method and apparatus for localization provide a technique to localize static class variables, so that the data elements of a particular class are localized when the class loader loads that class. The method and apparatus typically apply to localization of user interface data elements defined as text.

The method and apparatus for localization reduce complexity of the JAVA® application by eliminating the function code dedicated to localization. The custom class loader is added to the application to support localization by inspecting the application code loaded from a storage device, such as a disk or Network, together with the application. The custom class loader may be added during code transferring process to inspect the code and convert all strings of the application to localized strings. As a result, the application may become less complicated, because many programmatic errors may be eliminated during the process.

In addition, the method and apparatus for localization increase productivity of engineers who write language-independent code, and reduce memory consumption of classes that use localized strings. Since all localization is accomplished when the class is loaded and since the code that uses localization is independent of the code performing localization, the method and apparatus for localization ensure better performance of the application and afford better code reusability.

Figure 1:
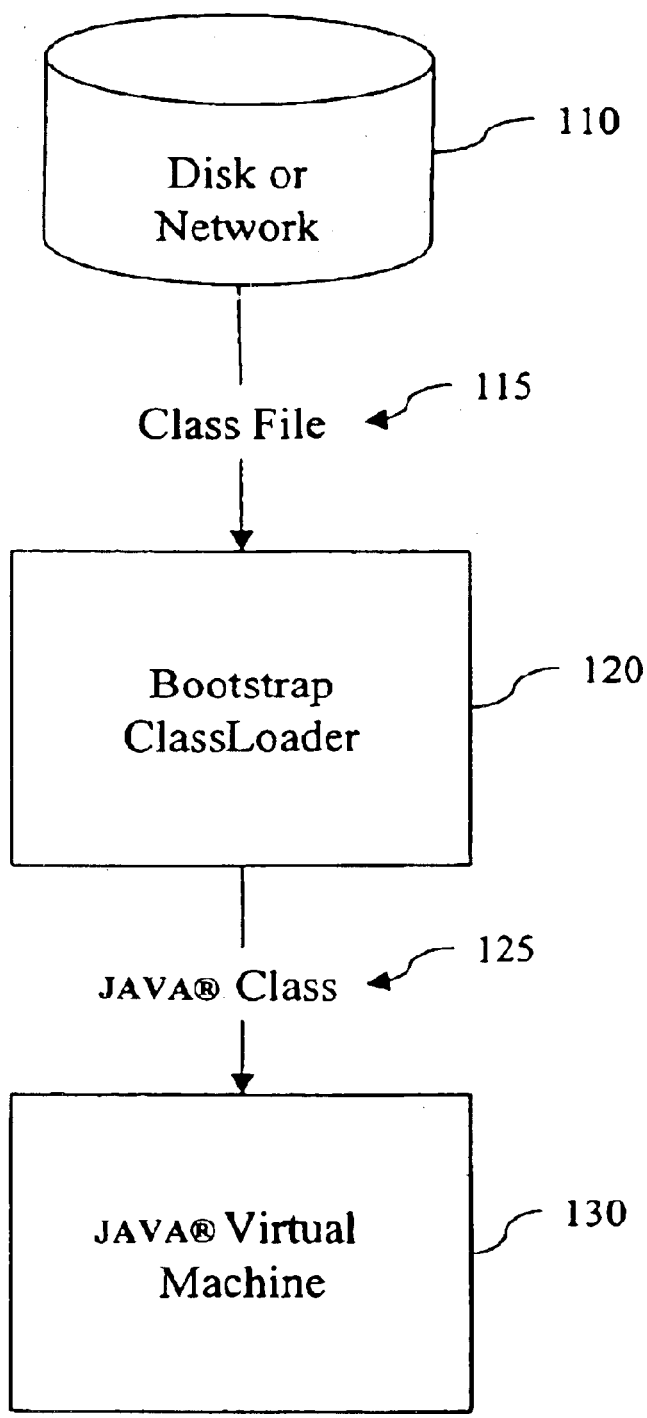
FIG. 1 illustrates a standard class loading process.

FIG. 1 illustrates a standard class loading process. Class files 115 are loaded from storage devices 110, such as disk or Network, to a bootstrap class loader 120. The bootstrap class loader 120 then converts the class files 115 into JAVA® classes 125 to be inputted in a JAVA® virtual machine 130. A class loader is an object that is responsible for loading classes. Given a name of a class, the class loader may attempt to locate or generate data that constitutes a definition for the class. A typical strategy is to transform the name of the class into a file name and then read a "class file" of the name from the a file system. Applications typically implement subclasses of ClassLoader in order to extend the manner in which the JAVA® virtual machine 130 dynamically loads classes. The ClassLoader class uses a delegation model to search for classes and resources. Each instance of the ClassLoader class has an associated parent class loader. When asked to find a class or resource, the ClassLoader instance may delegate the search for the class or resource to its parent class loader before attempting to find the class or resource itself. The JAVA® virtual machine's 130 built-in class loader, i.e., the bootstrap class loader 120, does not have a parent class loader, but may serve as the parent class loader of the ClassLoader instance. The JAVA® virtual machine 130 typically loads classes from a local file system in a platform-dependent manner. For example, on UNIX systems, the virtual machine loads classes from a directory defined by a classpath environment variable.

Figure 2:
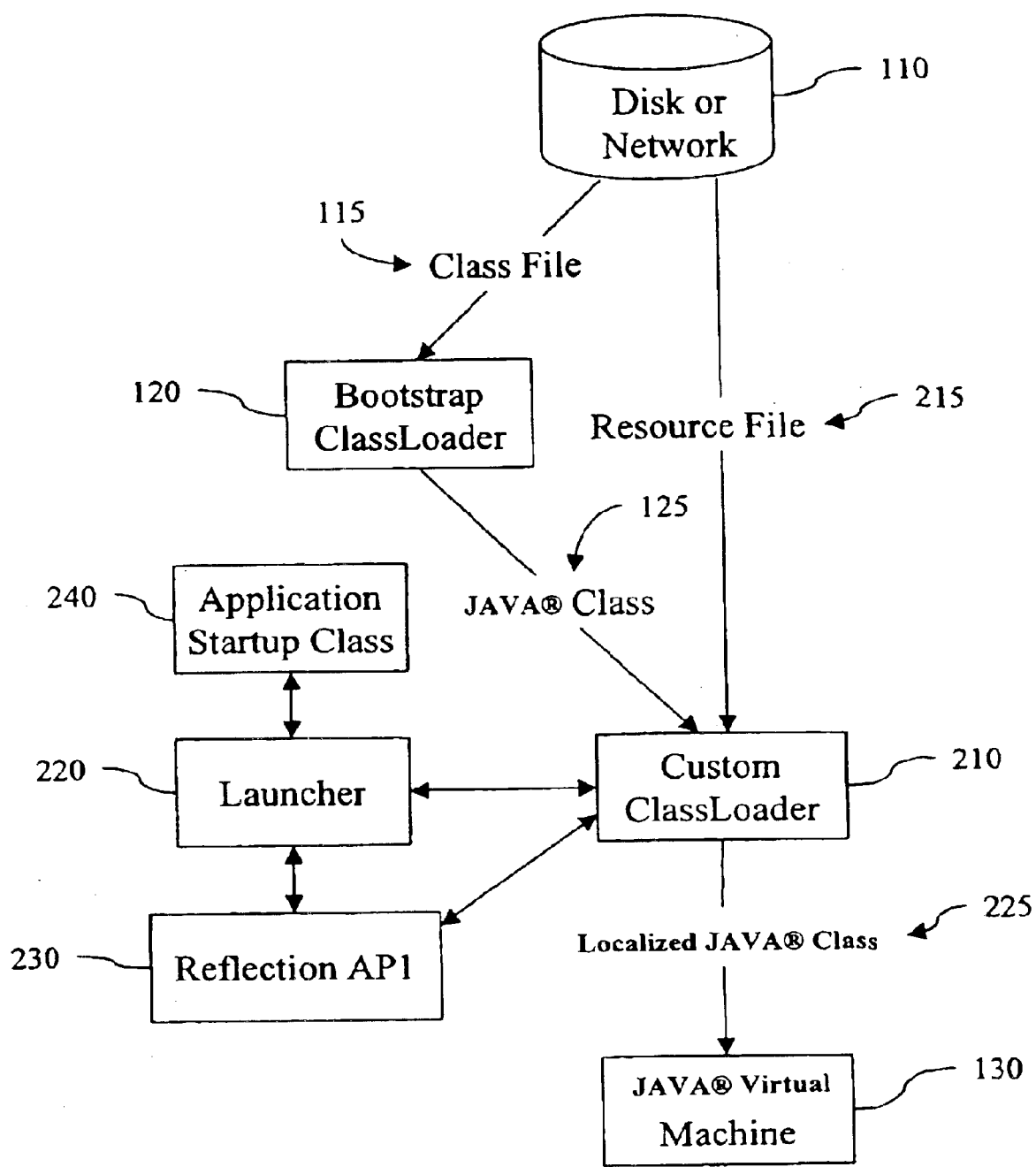
FIG. 2 illustrates a custom class loading process that implements an exemplary method for localization using a reflection API and a custom class loader.

FIG. 2 illustrates a custom class loading process that implements an exemplary method for localization using a reflection API and a custom class loader. Compared with the standard class loading process shown in FIG. 1, a custom class loader 210 is developed during class loading to load the JAVA® classes 125 from the bootstrap class loader 120. In a JAVA® application, the custom class loader class 210 is typically a subclass of java.lang.ClassLoader. The custom class loader 210 also retrieves resource files 215 (described later) from the storage devices 110, and inspects the application code in the resource files 215. The custom class loader 210, together with a reflection API 230 and a launcher 220, then converts all strings of the application to localized strings. Finally, the custom class loader 210 passes localized JAVA® classes 225 to the JAVA® virtual machine 130. The reflection API 230 is a part of standard JAVA® library that obtains descriptors of class variables. The launcher 220 typically creates the custom class loader 210, loads a startup class 240 of an application using the custom class loader 210, and runs the application by invoking a main method of the application startup class 240. The application startup class 240 is a class that starts the application, whereas the main method is a method that initiates the application's functionality. The launcher 220 and the custom class loader 210 classes are loaded by the bootstrap class loader 120. The launcher 220 may need to use the reflection API 230 to invoke the main method of the application startup class 240. The launcher 220 may need to have a static method main ( ), and be specified as a main class of the application, by, for example, including the launcher name as a parameter of a JAVA® command. The JAVA® virtual machine 130 may call the method main ( ) to invoke the main method of the application startup class 240.

The following rules are defined for an exemplary implementation of the method and apparatus for localization. Rule 1 is for distinguishing a plurality of localizable variables from all other variables by a variable name, whereas Rule 2 is for locating a resource string in the resource files 215 by a class name and the variable name. A localizable variable is a class variable that, for example, belongs to a public class, is a public static but not final variable, and has type java.lang.String. Rules 1 and 2 may be documented so that application developers can use the rules for defining the localizable variables and specifying keys in the resource files 215.

Figure 3:
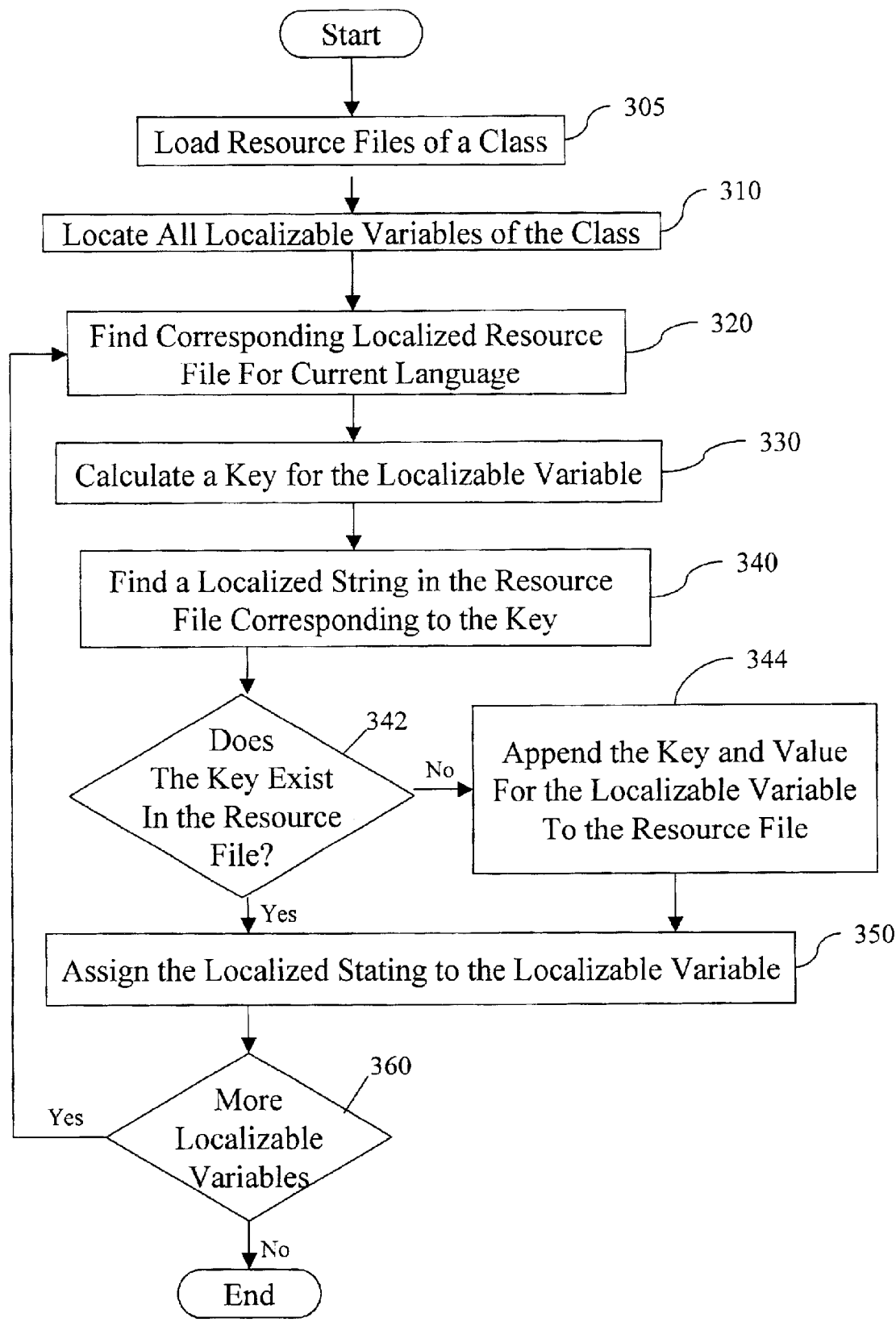
FIG. 3 is a flow chart illustrating an exemplary algorithm to be performed by a custom class loader to implement the exemplary method for localization of FIG. 2.

FIG. 3 is a flow chart illustrating an exemplary algorithm to be performed by a load class method of the custom class loader 210 to implement the exemplary method for localization. Referring to FIG. 3, the custom class loader 210 first loads the resource files 215 from the storage device 110 (block 305), and locates all localizable variables of a class using the reflection API 230 and Rule 1 (block 310). A skilled JAVA® programmer may be able to implement this step given a definition of Rule 1. Then, for each localizable variable, the custom class loader 210 finds a corresponding localized resource file 215 for a current language according to Rule 2 by, for example, searching variables with predefined prefix or postfix with LOC__ (block 320). All values in the resource files 215 may need to be specified before deploying the application.

Next, the custom class loader 210 calculates a key for each localizable variable according to Rule 2 by, for example, deleting the prefix and combining the class name and variable name (block 330). Then, the custom class loader 210 finds a localized string in the resource file 215 corresponding to each key (block 340). This step may be easily implemented by a skilled JAVA® programmer. Finally, the custom class loader 210 assigns the localized string to the corresponding localizable variable, if the string is found (block 350). If more localizable variables exist (block 360), blocks 320–350 repeat.

Another embodiment of the method for localization generates resource files 215 for a default language (for example, English) using the same principles as the steps described above. The resource files 215 may serve as documentation for developers that create resource files 215 for other languages. This process utilizes initial values of the localizable variables. The following Listing 1 shows a class with localizable variables that have default values.

---
Listing 1
--- package com.hp.sgmgr.tree;
public class Strings {
　　public static String LOC__OBJECT__MANAGER = "Object Manager";
　　public static String LOC__CLUSTERS = "All Clusters";
}

---

In this embodiment, following block 340 of the algorithm in FIG. 3, if the key exists in the resource files 215, the process goes to block 350 (block 342). If not, the custom class loader 210 appends the key and the value of the localizable variable to the resource file 215 (block 344). This process may be invoked once after all localizable variables are defined in the application.

After the custom class loader 210 is implemented, the launcher 220 may be created with a method, such as a main method of the launcher 220, i.e., main (String [ ]). The launcher 220 loads and runs the application startup class 240 using the custom class loader 210. The launcher 220 typically calls only one method of the application startup class 240, which runs the application. The name of the application startup class 240, the name and signature of the main method of the application startup class 240 may be application-specific. The launcher 220 may also pass parameters that are passed to the launcher's main method to the application's main method.

Figure 4:
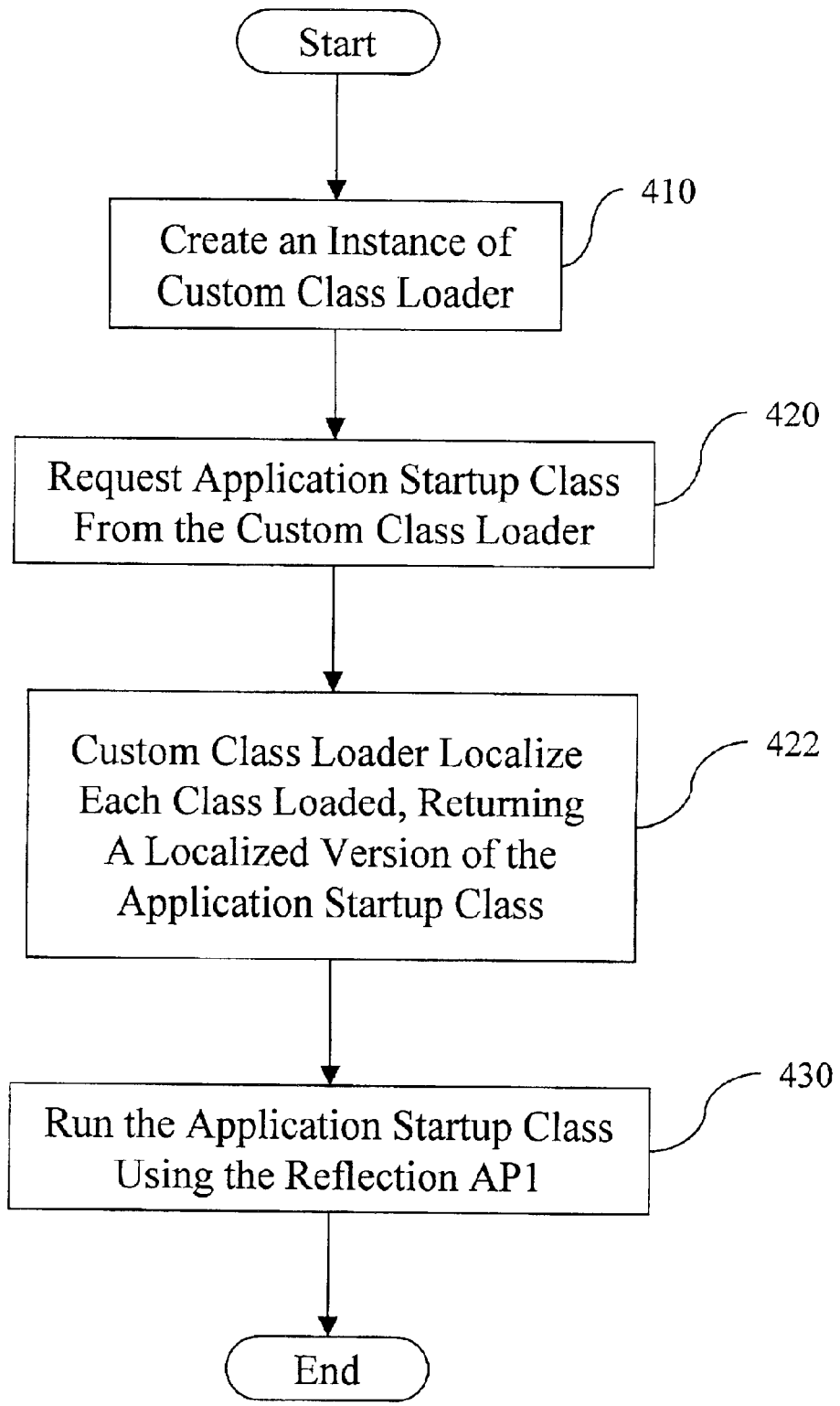
FIG. 4 is a flow chart illustrating an exemplary algorithm to be performed by a launcher to implement the exemplary method for localization of FIG. 2.

FIG. 4 is a flow chart illustrating an exemplary algorithm to be performed by the launcher 220 (shown in FIG. 2) to implement the exemplary method for localization. Referring to FIG. 4, after the launcher 220 is created, the launcher 220 first creates an instance of the custom class loader 210 (block 410). Then, the launcher 220 requests and loads the application startup class 240 from the custom class loader 210, by calling a method, such as Class.forName (String, ClassLoader),and specifies the application startup class name as a first parameter and the custom class loader instance as a second parameter (block 420). The custom class loader 210 localizes each class 240 loaded (block 422), and the method returns a localized version of the application startup class 240 to the launcher 220. The custom class loader 210 may also load all classes referenced by the application startup class 240, since by default a class is loaded by the same class loader as the referencing class. For example, if class A refers to class B, and class B is not loaded yet, then the JAVA® virtual machine 130 uses the same class loader that was used for loading class A to load class B. The launcher 220 and the custom class loader 210 may not refer to any other application classes. Finally, the launcher 220 invokes the main method and runs the application startup class 240 using the reflection API 230 (block 430).

All classes of the application loaded by the custom class loader 210 may access the localizable variables, which may contain strings in the target human language at run time. As a result, the method and apparatus for localization allows a JAVA® application to use a single human language during execution. The target language can be specified either to the launcher 220 in the command line, or determined by the custom class loader 210 based on the default environment setting, or by any another method that is convenient for the implementation.

The following illustrates an exemplary implementation of the method for localization using a reflection API and a custom class loader. In this example, the rules are identified as follows:

Rule 1: the variable contains a localized string if and only if its name begins with "LOC_".
Rule 2: the base name for the resource file is always "localize.properties".

The resource file name for the target language is constructed by passing the base name and JAVA® Locale object to java.util.ResourceBundle class. The ResourceBundle class adds a postfix to the file name for locating the resource file 215 for specified human language. The resource file 215 is located in the same directory as the class file containing the variable. A key is constructed by concatenating the class name with variable name minus "LOG_" prefix, adding a dot (".") between the class name and variable name.

Listing 2 shows an example of a class with localizable variables.

---
Listing 2
---
package com.hp.sgmgr.tree;
public class Strings {
    public static String LOC_OBJECT_MANAGER;
    public static String LOC_CLUSTERS;
}
---

According to Rule 1, the class in Listing 2 contains two variables: "LOC_OBJECT_MANAGER" and "LOC_CLUSTERS".

According to Rule 2, the base path/file name of resource file 215 corresponding to both variables in this class is "com/hp/sgmgr/tree/localize.properties". The keys corresponding to these variables are "Strings.OBJECT_MANAGER" and "Strings.CLUSTERS".

Listing 3 shows the resource file containing the values of localizable variables for the class from Listing 2 for English language.

---
Listing 3
---
Strings.OBJECT_MANAGER=Object Manager
Strings.CLUSTERS=All Clusters
---

Referring to Listing 3, class ResourceBundle, which is used in the exemplary implementation, supports this format of resource files 215. In this format, each line in the resource files 215 contains one key-value pair, where both the key and value are strings, and are divided by the "=" character.

In this example, the implementation of the custom class loader 210 uses class ResourceBundle for retrieving localized strings by keys. The custom class loader 210 accepts the target language code as a parameter to its constructor, and passes the target language code to ResoucreBundle, which locates resource files 215 corresponding to the target language. The constructor is a method or procedure that is invoked when an object is created in order to initialize the variables of the object. A class may have more than one constructors, and the JAVA® virtual machine 130 has rules that define which constructor to call. Finally, the launcher 220 reads a configuration file containing the target language specified at the time of installation, and passes the code of target language to the custom class loader 210 to create the custom class loader 210. Alternatively, the custom class loader 210 may also read the configuration file. As a further alternative, the target language is passed as a parameter to the launcher 220 by a user.

Figure 5:
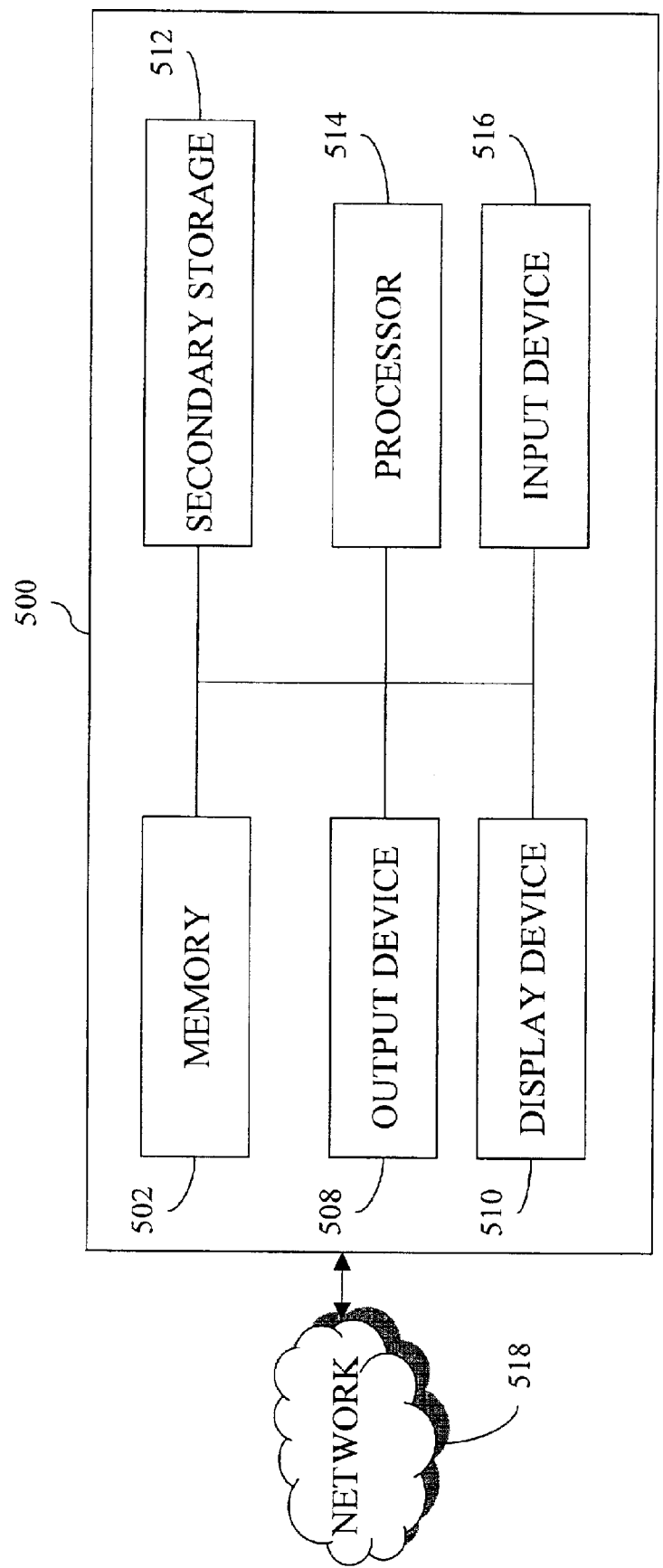
FIG. 5 illustrates exemplary hardware components of a computer that may be used in connection with the method for localization using a reflection API and a custom class loader.

FIG. 5 illustrates exemplary hardware components of a computer 500 that may be used in connection with the method for localization using a reflection API and a custom class loader. The computer 500 includes a connection with a network 518 such as the Internet or other type of computer or telephone networks. The computer 500 typically includes a memory 502, a secondary storage device 512, a processor 514, an input device 516, a display device 510, and an output device 508.

The memory 502 may include random access memory (RAM) or similar types of memory. The secondary storage device 512 may include a hard disk drive, floppy disk drive, CD-ROM drive, or other types of non-volatile data storage, and may correspond with various databases or other resources. The processor 514 may execute information stored in the memory 502, the secondary storage 512, or received from the Internet or other network 518. The input device 516 may include any device for entering data into the computer 500, such as a keyboard, keypad, cursor-control device, touch-screen (possibly with a stylus), or microphone. The display device 510 may include any type of device for presenting visual image, such as, for example, a computer monitor, flat-screen display, or display panel. The output device 508 may include any type of device for presenting data in hard copy format, such as a printer, and other types of output devices including speakers or any device for providing data in audio form. The computer 500 can possibly include multiple input devices, output devices, and display devices.

Although the computer 500 is depicted with various components, one skilled in the art will appreciate that the computer 500 can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling the computer 500 to perform a particular method.

While the method and apparatus for localization using a reflection API and a custom class loader have been described in connection with an exemplary embodiment, those skilled in the art will understand that many modifications in light of these teachings are possible, and this application is intended to cover any variations thereof.

What is claimed is:

1. A method for localization of computer software application, comprising:
   locating a plurality of localizable variables of a class using a custom class loader;
   finding a corresponding resource file for a current language for each localizable variable by searching variables with predefined prefix;
   calculating a key for each localizable variable by deleting the prefix and combining a class name and a variable name;
   finding a localized string in the resource file corresponding to each key; and
   assigning the localized string to the corresponding localizable variable of the class,
      wherein the custom class loader provides localization of the class during class loading;
   the use of a reflection application programming interface (API) capable of obtaining descriptors of variables of the class; and
   the use of a launcher capable of creating an instance of the custom class loader and running an application startup class using the reflection API.

2. The method of claim 1, further comprising:
   creating an instance of the custom class loader using a launcher;
   requesting an application startup class from the custom class loader;
   returning a localized version of the application startup class; and
   running the application startup class using a reflection application programming interface (API).

3. The method of claim 1, further comprising loading resource files of the class from a storage device using the custom class loader.

4. The method of claim 1, further comprising:
   loading the class from a bootstrap class loader; and
   passing a localized class to a virtual machine.

5. An apparatus for localization of a computer software application, comprising:
   a custom class loader capable of inspecting codes of the application, finding a corresponding resource file for a current language for each localizable variable by searching variables with predefined prefix, calculating a key for each localizable variable by deleting the prefix and combining a class name and a variable name, and converting strings of a class to localized strings during class loading, thereby providing localization of the class during class loading;
   a reflection application programming interface (API) capable of obtaining descriptors of variables of the class; and
   a launcher capable of creating an instance of the custom class loader and running an application startup class using the reflection API.

6. The apparatus of claim 5, wherein the custom class loader is a subclass of a language class loader.

7. The apparatus of claim 5, wherein the custom class loader locates the plurality of localizable variables of the class.

8. The apparatus of claim 7, wherein the custom class loader finds a localized string in the resource file corresponding to each key.

9. The apparatus of claim 8, wherein the custom class loader assigns the localized string to the corresponding localizable variable of the class.

10. The apparatus of claim 5, wherein the custom class loader loads the class from a bootstrap class loader.

11. The apparatus of claim 5, wherein the custom class loader passes a localized class to a virtual machine.

12. The apparatus of claim 5, wherein the launcher creates an instance of the custom class loader.

13. The apparatus of claim 5, wherein the launcher requests an application startup class from the custom class loader, wherein the custom class loader returns a localized version of the application startup class.

14. The apparatus of claim 13, wherein the custom class loader runs the application startup class using a reflection application programming interface (API).

15. A computer readable medium providing instructions for localization of a computer software application, the instructions comprising:
   locating a plurality of localizable variables of a class using a custom class loader;
   finding a corresponding resource file for a current language for each localizable variable by searching variables with predefined prefix;
   calculating a key for each localizable variable by deleting the prefix and combining a class name and a variable name;
   finding a localized string in the resource file corresponding to each key; and
   assigning the localized string to the corresponding localizable variable of the class,
      wherein the custom class loader provides localization of the class during class loading;

a reflection application programming interface (API) capable of obtaining descriptors of variables of the class; and a launcher capable of creating an instance of the custom class loader and running an application startup class using the reflection API.

16. The computer readable medium of claim 15, further comprising instructions for:

creating an instance of the custom class loader using a launcher;

requesting an application startup class from the custom class loader;

returning a localized version of the application startup class; and running the application startup class using a reflection application programming interface (API).

17. The computer readable medium of claim 15, further comprising instructions for loading resource files of the class from a storage device using the custom class loader.

18. The computer readable medium of claim 15, further comprising instructions for:

loading the class from a bootstrap class loader; and passing a localized class to a virtual machine.

\* \* \* \* \*